(12) United States Patent
Kulkarni et al.

(10) Patent No.: US 12,508,867 B2
(45) Date of Patent: Dec. 30, 2025

(54) USER-GUIDED REFRIGERANT RECHARGE FOR VEHICLES

(71) Applicant: Energizer Auto, Inc., St. Louis, MO (US)

(72) Inventors: Tushar Kulkarni, Englewood, OH (US); Michael K. Sherman, Southbury, CT (US); Jacob Fahsbender, Danbury, CT (US); Christopher A. Bourne, Painesville, OH (US); Joanna Lynn Celestina, Westlake, OH (US); Thanh Ngoc Tran, Meriden, CT (US)

(73) Assignee: Energizer Auto, Inc., St. Louis, MO (US)

( * ) Notice: Subject to any disclaimer, the term of this patent is extended or adjusted under 35 U.S.C. 154(b) by 223 days.

(21) Appl. No.: 18/074,922

(22) Filed: Dec. 5, 2022

(65) Prior Publication Data
US 2023/0173876 A1   Jun. 8, 2023

Related U.S. Application Data

(60) Provisional application No. 63/264,898, filed on Dec. 3, 2021.

(51) Int. Cl.
*B60H 1/00* (2006.01)
*B60S 5/00* (2006.01)

(52) U.S. Cl.
CPC ..... *B60H 1/00585* (2013.01); *B60H 1/00657* (2013.01); *B60S 5/00* (2013.01)

(58) Field of Classification Search
CPC .............. F25B 45/00; F25B 2345/001; F25B 2345/003; F25B 2345/006; F25B 2500/19;

(Continued)

(56) References Cited

U.S. PATENT DOCUMENTS 5,239,865 A   8/1993 Salzer et al.
5,481,481 A   1/1996 Frey et al.
(Continued)

FOREIGN PATENT DOCUMENTS

GB         2584579 A     12/2020
WO   WO-2021187950 A1 *  9/2021
WO    WO2022109603 A1    5/2022

OTHER PUBLICATIONS

International Preliminary Report on Patentability issued for related Application No. PCT/US2022/051824, mailed Jun. 13, 2024 (8 pages).

(Continued)

*Primary Examiner* — Jianying C Atkisson
*Assistant Examiner* — Meraj A Shaikh
(74) *Attorney, Agent, or Firm* — Lee & Hayes, P.C.

(57) ABSTRACT

In one aspect, a system for recharging a refrigeration system of a vehicle is provided. The system includes a refrigerant delivery device configured to removably couple to a recharge port of the refrigeration system. The refrigerant delivery device comprises a controller, a refrigerant container, and at least one sensor. The controller is configured to communicatively couple with User Equipment (UE) of a user over a communication channel. The refrigerant container stores a refrigerant. The at least one sensor is configured to measure one or more parameters of the refrigeration system. The controller is configured to transmit, via the communication channel, the one or more parameters of the refrigeration system to the UE, receive, via the communication channel, one or more commands from the UE to perform a recharge process for the refrigeration system, and selectively deliver the refrigerant to the refrigeration system in response to the one or more commands.

20 Claims, 13 Drawing Sheets

(58) Field of Classification Search
CPC ............ B60H 1/00585; B60H 1/00735; B60H 1/00978; B60H 1/00985; B60H 2001/3248; B60H 2001/3255
See application file for complete search history.

(56) References Cited

U.S. PATENT DOCUMENTS

| | | | |
|---|---|---|---|
| 5,987,903 | A | 11/1999 | Bathla |
| 6,101,820 | A | 8/2000 | Cheballah |
| 6,571,566 | B1 | 6/2003 | Temple et al. |
| 7,260,943 | B2 | 8/2007 | Carrubba et al. |
| 8,301,403 | B2 | 10/2012 | Weick |
| 9,310,094 | B2 | 4/2016 | Kates |
| 9,568,226 | B2 | 2/2017 | Schuster et al. |
| 2006/0101834 | A1* | 5/2006 | Govekar .................. F25B 45/00 62/149 |
| 2006/0101835 | A1* | 5/2006 | Meldahl .................. F25B 9/008 62/149 |
| 2007/0283706 | A1* | 12/2007 | Kang ...................... F25D 21/12 62/156 |
| 2008/0022701 | A1 | 1/2008 | Carrubba |
| 2009/0113901 | A1 | 5/2009 | Carrubba et al. |
| 2013/0118198 | A1* | 5/2013 | Brown .................... F25B 45/00 137/334 |
| 2019/0009638 | A1 | 1/2019 | Bonifaccino |
| 2020/0378319 | A1* | 12/2020 | Makkiya ............. F02N 11/0837 |

OTHER PUBLICATIONS

PCT Search Report and Written Opinion dated Apr. 18, 2023 for corresponding International Application No. PCT/US22/51824 (15 pages).

* cited by examiner

USER-GUIDED REFRIGERANT RECHARGE FOR VEHICLES

CROSS REFERENCE TO RELATED APPLICATION

This application claims the benefit of priority to U.S. Provisional Patent Application Ser. No. 63/264,898, entitled "User-Guided Refrigerant Recharge for Vehicles," filed on Dec. 3, 2021, the content of which is hereby incorporated by reference in its entirety.

BACKGROUND

The field of the disclosure relates to refrigeration systems, and more particularly, to recharging refrigeration systems for vehicles.

Refrigeration systems have been relied upon as a principal source of cooling in a variety of applications. Refrigeration systems are found in, for example, vehicles, commercial buildings, and residential buildings. Many refrigeration systems (also referred to as air conditioning systems) use a circulating medium (for example, a refrigerant) that absorbs and removes heat from the space to be cooled and subsequently rejects the absorbed heat elsewhere.

Refrigeration systems operate based on principles of the Reversed Carnot Cycle, also known as the Vapor-Compression Refrigerant Cycle. The ability to achieve cooling depends to some degree on the level of liquid refrigerant present in the system. The amount of fluid in the refrigerant system may directly influence the performance of vapor-compression-refrigeration systems. When the system is undercharged of refrigerant, the system may not operate at design set points, risking shortened compressor life, poor cooling performance, and ultimately putting the compressor at risk of mechanical failure. When the system is overcharged of refrigerant, the liquid refrigerant may enter the compressor, resulting in damage to the compressor. Further, an increased high side pressure may put more load on the compression system resulting in poorer fuel economy along with increased wear on the compressor. Further still, higher pressures also can result in exceeding the refrigerant systems pressure safety limits and increasing compressor operating temperatures, which may result in the system turning off and also affecting the overall cooling performance of the system.

Several factors may adversely affect the level of refrigerant in the system. For example, the refrigeration system may be subject to significant swings in temperature and frequent thermal cycling due to the action of the system itself and the heat produced by power sources (for example, engines). Under these conditions, joints and fittings may tend to expand and contract, permitting refrigerant to slowly leak out of the system. In another example, the hoses used in the system may be slightly permeable to the refrigerant, which may also permit the refrigerant to slowly leak out of the hoses. Accordingly, maintenance of refrigerant systems may entail monitoring the refrigerant level and periodically re-charging of the refrigerant.

Charge adequacy may be checked manually by trained service technicians using pressure gauge measurements, temperature measurements, and a pressure-to-refrigerant temperature relationship chart for the particular refrigerant resident in the system. For refrigerant systems, which use a thermal expansion valve (TXV) or an electronic expansion valve (EXV), the superheat of the refrigerant entering the compressor may be regulated at a fixed value, while the amount of subcooling of the refrigerant exiting the condenser may vary. In most systems, the "subcooling method" may be used as an indicator for charge level. The amount of subcooling is calculated by determining the saturated refrigerant temperature from the refrigerant pressure measured between the outlet of the condenser coil and prior to the expansion device for the refrigerant in use. The saturated refrigerant temperature minus the actual refrigerant temperature measured between the outlet of the condenser coil and prior to the expansion device is determined and compared to a range of acceptance levels of subcooling.

A refrigerant pressure and temperature may be measured between the condenser outlet and prior to the expansion valve. The consumer may then refer to a pressure/temperature relationship chart for the refrigerant in use to determine the saturated refrigerant temperature at the measured pressure. Based on the measured pressure, the amount of cooling actually present at the current operating conditions (for example, outdoor temperature, indoor temperature, humidity, indoor airflow, and the like) may be calculated. If the measured amount of cooling lies within the range of acceptable levels, the system is deemed to be properly charged. If not, the consumer may adjust the refrigerant charge by either adding a quantity of refrigerant to the system or removing a quantity of refrigerant from the system, as appropriate. Methods for determining the refrigerant charge level in an air conditioning system are described in U.S. Pat. No. 5,239,865 to Salzer et al.; U.S. Pat. No. 5,481,481 to Frey et al.; U.S. Pat. No. 5,987,903 to Bathla; U.S. Pat. No. 6,101,820 to Cheballah; U.S. Pat. No. 6,571,566 to Temple et al.; U.S. Pat. No. 9,568,226 to Schuster et al.; and U.S. Pat. No. 9,310,094 to Kates, all of which are incorporated herein by reference.

U.S. Pat. No. 8,301,403 to Weick; U.S. Pat. No. 7,260,943 to Carrubba et al.; and U.S. Patent Application Publication Nos. 2008/0022701 and 2009/0113901 to Carrubba et al., all of which are incorporated herein by reference, describe various apparatus that may allow a consumer to measure the refrigerant pressure in an automobile air conditioner and to add refrigerant as needed.

Most of these prior art methods and apparatus provide only a qualitative determination of whether the charge level is below or above acceptable and are not easily used by a do-it-yourself consumer.

There is, therefore, a need for improving the determination of refrigerant charge level in vapor-compression-refrigerant systems that is both relatively inexpensive and reliable under a wide range of ambient temperature conditions, especially for a typical user that may not have specialized training.

BRIEF DESCRIPTION

In one aspect, a system for recharging a refrigeration system of a vehicle is provided. The system includes a refrigerant delivery device configured to removably couple to a recharge port of the refrigeration system. The refrigerant delivery device comprises a controller, a refrigerant container, and at least one sensor. The controller is configured to communicatively couple with User Equipment (UE) of a user over a communication channel. The refrigerant container stores a refrigerant. The at least one sensor is configured to measure one or more parameters of the refrigeration system. The controller is configured to transmit, via the communication channel, the one or more parameters of the refrigeration system to the UE, receive, via the communication channel, one or more commands from the UE to perform a recharge process for the refrigeration system, and selectively deliver the refrigerant to the refrigeration system in response to the one or more commands.

In another aspect, a system for recharging a refrigeration system of a vehicle is provided. The system includes a UE of a user that is configured to communicatively couple with a refrigerant delivery device over a communication channel. The UE is configured to direct the user to couple the refrigerant delivery device to a recharge port of the refrigeration system, receive one or more parameters of the refrigeration system from the refrigerant delivery device via the communication channel, and transmit one or more commands to the refrigerant delivery device via the communication channel that directs the refrigerant delivery device to selectively deliver refrigerant to the refrigeration system based on the one or more parameters of the refrigeration system.

In another aspect, a method operable by UE of a user for recharging a refrigeration system of a vehicle is provided. The method comprises directing, by the UE, the user to couple a refrigerant delivery device to a recharge port of the refrigeration system, receiving, by the UE, one or more parameters of the refrigeration system from the refrigerant delivery device via a communication channel between the UE and the refrigerant delivery device, and transmitting, by the UE, one or more commands to the refrigerant delivery device via the communication channel that directs the refrigerant delivery device to selectively deliver refrigerant to the refrigeration system based on the one or more parameters of the refrigeration system.

DRAWINGS

These and other features, aspects, and advantages of the present disclosure will become better understood when the following detailed description is read with reference to the accompanying drawings in which like characters represent like parts throughout the drawings, wherein.

Figure 1:
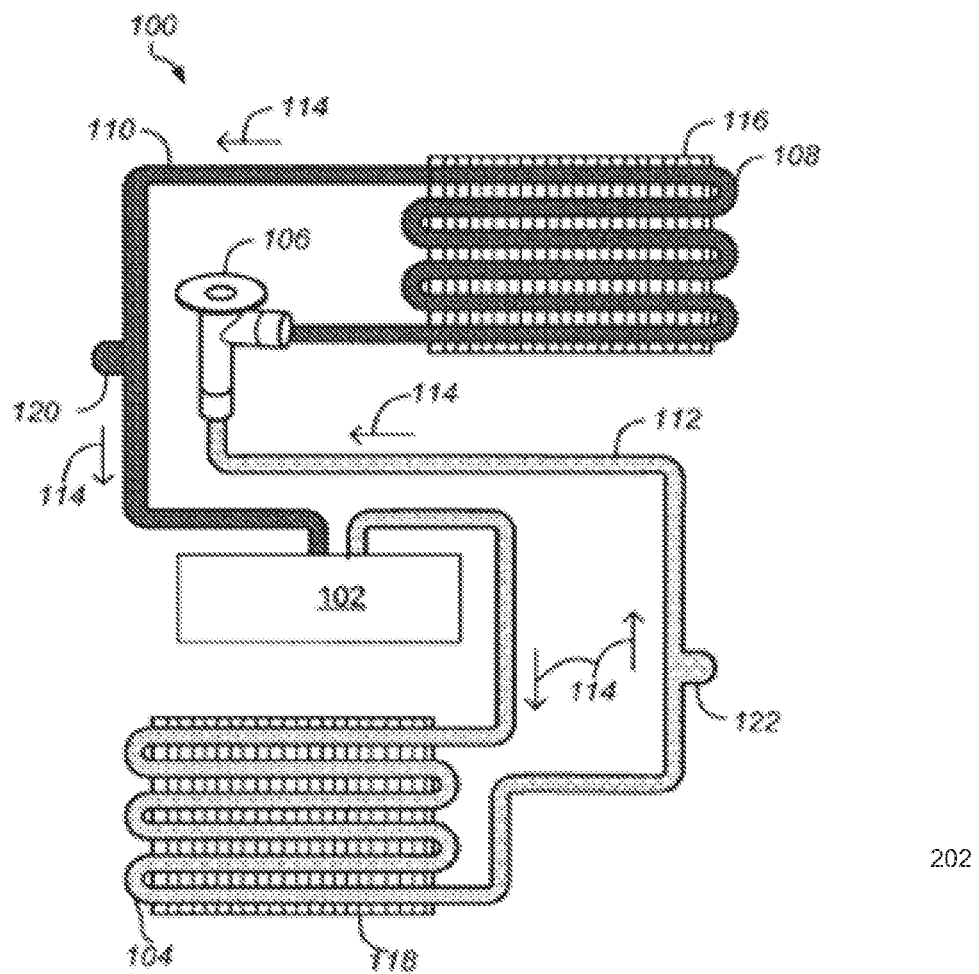
FIG. 1 depicts a known vapor-pressure refrigerant system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

FIG. 1 depicts a known vapor-compression-refrigeration system 100. In FIG. 1, the refrigeration system 100 includes a compressor 102, a condenser coil 104, an expansion device 106, and an evaporator coil 108 connected in a serial relationship with refrigerant flowing through refrigerant piping 110, 112 to form a refrigerant flow circuit.

The refrigerant used in the refrigeration system 100 may include a volume of hydrocarbons, halogenated hydrocarbons, other compressible fluids, and mixtures thereof. In some embodiments, refrigerant may include ammonia and/or water. Halogenated hydrocarbons include, but are not limited to, fluorinated hydrocarbons, chlorinated, fluorinated hydrocarbons, fluorinated ethers, 2,3,3,3-tetrafluorprop-1-ene (HFO-1234yf), 1,1,1,2-tetrafluorethane, dichlorodifluoromethane, or mixtures thereof. Commercially available fluid sources include, but are not limited to, HFO-1234yf refrigerants (for example, Genetron® (Honeywell, USA), Opteon® (DuPont™, USA), R-134a, R-12, or the like. In some embodiments, refrigerant may also include other suitable chemicals including, but not limited to, dyes and/or system lubricants.

The refrigerant circulating through the refrigerant circuit (shown by arrows 114) passes through the evaporator coil 108 in an evaporator 116, which is in a heat exchange relationship with air being passed over the evaporator coil 108 by a fan (not shown). As the air passes over the evaporator coil 108, the refrigerant absorbs the heat in the air passing over the evaporator coil, thereby cooling the air and evaporating the refrigerant. The fan circulates the cool air into an area designated for cooling.

After evaporation, the refrigerant circuit draws refrigerant vapor to the compressor 102. In the compressor 102, the refrigerant vapor is pressurized. Hot, high-pressure vapor exits the compressor 102 and enters the condenser coil 104. The condenser coil 104 is in a heat exchange relationship with ambient temperature air passing over the condenser coil by a condenser fan (not shown). As the air passes through the condenser 118 and over the condenser coil 104, the refrigerant rejects heat to the air passing over, thereby heating the air, and condensing the high-pressure refrigerant vapor to a high-pressure liquid refrigerant. The high-pressure liquid refrigerant leaving the condenser 118 enters the expansion device 106. The expansion device 106 expands the high-pressure refrigerant liquid to a lower temperature, lower pressure refrigerant liquid, before it enters the evaporator 116.

The expansion device 106 may be a valve such as a thermostatic expansion valve (TXV), an electronic expansion valve (EXV), an orifice tube (OT), a variable orifice tube (VaT) or other device designed to expand the fluid refrigerant. The expansion device 106 may regulate the amount of liquid refrigerant entering the evaporator coil 108 in response to the superheat condition of the refrigerant exiting the evaporator 116. It should be understood that the invention is equally applicable for use in association with other refrigerant vapor compression systems such as heat pump systems. In a heat pump system, during cooling mode, the process is identical to that as described herein. In the heating mode of heat pump system, the cycle is reversed with the condenser and evaporator of the cooling mode acting as an evaporator and condenser, respectively.

The refrigeration system 100 in this embodiment further includes a low-pressure port 120 and a high-pressure port 122. The low-pressure port 120 is located downstream of the evaporator 116 and before the compressor 102. The high-pressure port 122 is located downstream of the condenser 118 and before the expansion device 106. The low-pressure port 120 and the high-pressure port 122 are both under pressure when the refrigeration system 100 contains some level of refrigerant. However, the low-pressure port 120 has a lower pressure than the high-pressure port 122. In many recharge applications, refrigerant is added to the refrigeration system 100 through the low-pressure port 120. In some instances, pressure and/or temperature measurements are obtained by coupling a pressure sensor and/or temperature sensor to the low-pressure port 120. These measurements may be used to determine refrigerant level in the refrigerant system 100.

Figure 2:
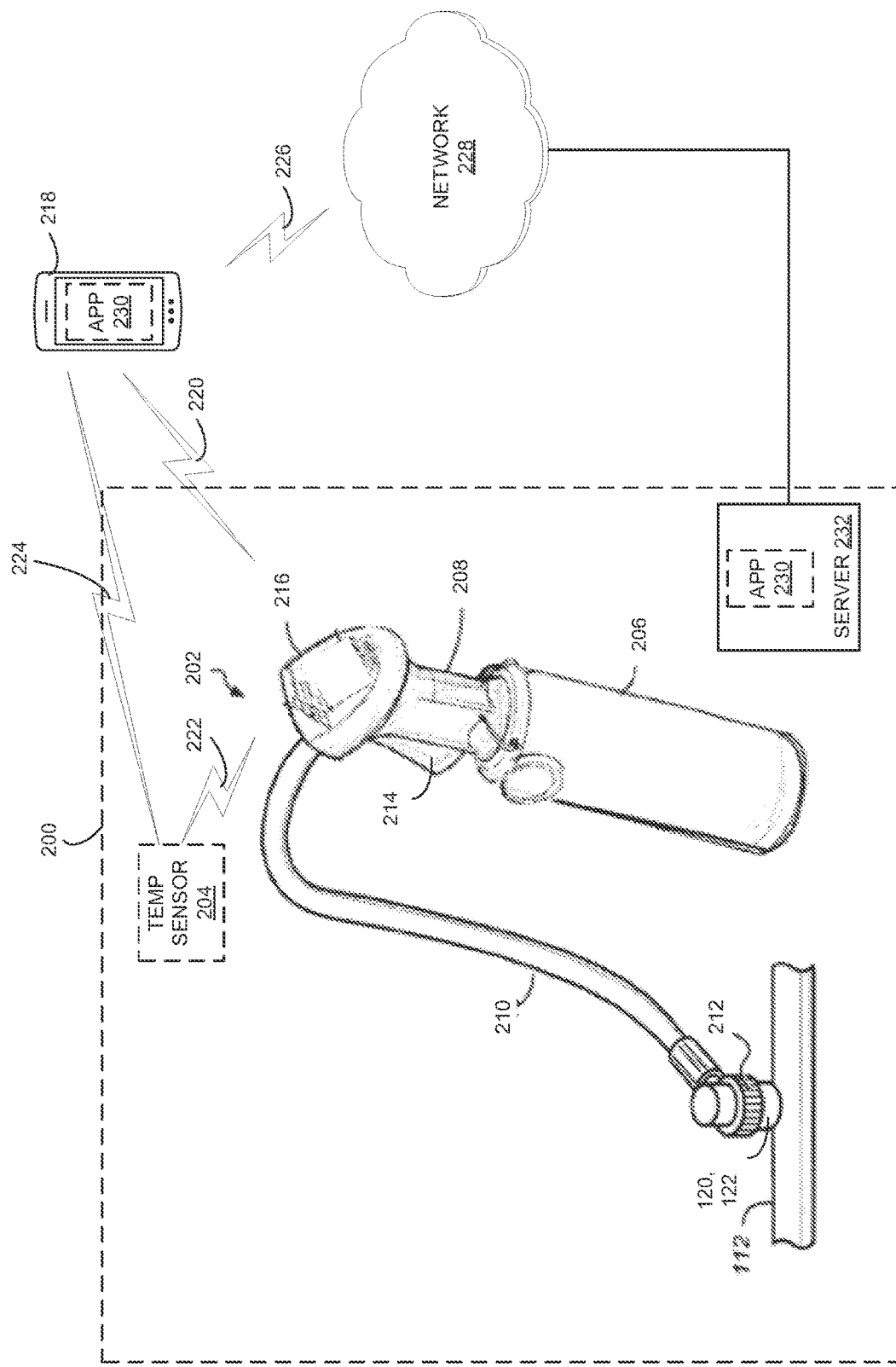
FIG. 2 depicts a system for recharging a vehicle refrigeration system in an exemplary embodiment.

FIG. 2 depicts a system 200 for recharging a refrigeration system in an exemplary embodiment. In this embodiment, the system 200 includes a refrigerant delivery device 202. In some embodiments, the system 200 further includes a temperature sensor 204, which senses temperatures of an Air Conditioning (AC) vent in an automobile during the recharge process.

In this embodiment, the delivery device 202 includes a refrigerant container 206, a main body 208, and a hose 210. The hose 210 removably couples the delivery device 202 to a port of a vehicle refrigeration system via a coupler 212 (e.g., the low-pressure port 120 of the refrigerant system 100). The refrigerant container 206 may be removably coupled to the main body 208 in some embodiments. The refrigerant container 206 comprises any component, system, or device that provides a source of refrigerant for a refrigerant system (e.g., the refrigerant system 100). Typically, the refrigerant stored in the refrigerant container 206 is under pressure (e.g., at a pressure higher than the pressure typically found at the low-pressure port 120 of the refrigerant system 100, which may be about 25 Pounds per Square Inch (PSI)).

The main body 208 in this embodiment further includes a controller 216 (not visible in FIG. 2) which controls the operation of the delivery device 202, and a trigger 214. The trigger 214 comprises any component, system, or device that selectively provides user inputs to the controller 216. In some embodiments, the trigger 214 is a mechanical device with a position indicator, which the controller 216 reads in order to modify the operation of the delivery device 202. In other embodiments, the trigger 214 is a capacitive trigger or another type of non-mechanical device, which the controller 216 senses in order to modify the operation of the delivery device 202.

In this embodiment, the controller 216 communicates with user equipment (UE) 218 over a wireless link 220 to provide information to a user of the UE 218 during a refrigerant recharge process. The wireless link 220 provides bi-directional communication between UE 218 and delivery device 202 in some embodiments, and unidirectional communication from delivery device 202 to UE 218 in other embodiments. UE 218 comprises a smartphone, a tablet, a smart watch, or some other type of device in various embodiments. In this embodiment, UE 218 executes an application 230, which coordinates with the controller 216 of delivery device 202 in order to guide the user of UE 218 through a refrigerant recharge process (e.g., for a vehicle). The application 230 may be stored on a server 232 of the system 200 and downloaded by the UE 218 prior to using the delivery device 202.

In some embodiments, the temperature sensor 204 is used during the recharge process to measure a temperature of an AC vent in a vehicle during the recharge process. The temperature sensor 204 communicates temperature information with the controller 216 of the delivery device 202 via the wireless link 222 in some embodiments and communicates temperature information with the application 230 executing on the UE 218 via the wireless link 224 in other embodiments.

The application 230 executing on the UE 218, in some embodiments, communicates with a network 228 via a wireless link 226. For example, the network 228 may provide information to the application 230 during the recharge process, in order for the application 230 to coordinate with the controller 216 to guide the user of the UE 218 through the recharge process. This information may include, without limitation, a local temperature, a local humidity, a local pressure, etc. In some embodiments, the application 230 obtains the local temperature, the local humidity, and/or the local pressure directly from the UE 218 and/or other applications executing on the UE 218.

The information obtained by the application 230 via the network 228 may further include, without limitation, troubleshooting information that may be used during the recharge process (e.g., the application 230 provides the user real-time or near real-time access to a technician). In some embodiments, the application 230 utilizes a camera of the UE 218 (not shown) to photograph an engine bay of a vehicle and utilizes the network 228 to mark a location on the photo for the user that identifies a location of a low-pressure port AC charge port for the vehicle. In other embodiments, the application 230 queries the user for the make and model information for the vehicle, and downloads and displays a diagram of the engine bay showing the location of the low-pressure port (e.g., via the network 228).

Generally, the wireless links 220, 222, 224, and 226 may utilize any type of protocol and/or communication standard in order to implement the communication functionality described herein. Some examples of wireless standards that may be used include Wi-Fi, Bluetooth, Near Field Communications (NFC), etc.

The controller 216, in various embodiments, provides various types of information to the application 230 executing on the UE 218 to aid in the recharge process. In some embodiments, the controller 216, while the hose 210 is coupled to the a low-pressure AC port of the vehicle, measures various parameters of the refrigeration system for the vehicle, such as a pressure at the low-pressure port, a temperature at the low-pressure port, etc. The controller 216, in some embodiments, provides various types of information regarding the status of the delivery device 202 to the application 230 executing at the UE 218, such as the status of the trigger 214 (e.g., trigger is engaged or disengaged), a pressure and/or fluid level for refrigerant stored by the refrigerant container 206, timestamps associated with various state changes of the delivery device 202, a charge level of a battery (not shown) of the delivery device 202, etc.

In the embodiments described herein, the system 200 generally provides, at least, the following technical features:
1. In some embodiments, the controller 216 reads the pressure at the low-pressure AC port of the vehicle, and transmits time stamps, pressure values, a power status of the delivery device 202, a battery charge level for a battery of the delivery device 202, and a trigger state (pressed or released) to the UE 218. Time stamps may be used to temporally correlate the various parameters sent by the controller 216 when the parameters are displayed by the UE 218. The power status may be used to determine if the wireless link 220 between the delivery device 202 and the UE 218 has been lost.
2. The communication between the controller 216 and the application 230 is unilateral in some embodiments, no signal is received from the UE 218. In some embodiments, a LED on the controller 216 (not shown) is lit indicating completion of pairing with the UE 218. These embodiments may be implemented to reduce cost, resulting in a recharge process that is more manual although still directed by the application 230 through instructions to the user.
3. The application 230 asks the user to enable location services on the UE 218 in some embodiments, the application grabs information from other apps on the UE 218 about ambient temperature, pressure, and/or relative humidity, and can display some of this information on the UE 218 while the user is charging the AC system of the vehicle. The information collected from the other applications may also be used to improve the charging accuracy. Generally, the charging process may be improved using information about the ambient conditions for the delivery device 202.
4. The application 230 displays different messages depending on the pressure value, trigger state, the power status, and the battery level. For example, the pressure value may be used to indicate whether to initiate a recharge (e.g., the pressure measured is below, for example, about 25 PSI), whether to bypass a recharge (e.g., the pressure measured is above, for example, about 50 PSI), or whether the user should check the temperature at the AC vent to determine if a recharge is desired (e.g., the pressure is between about 25 PSI and about 50 PSI). In another example, the trigger state may be used to display various information to the user on the application 230, such as a battery level at the delivery device 202 (e.g., when the trigger 214 is engaged) or a pressure value (e.g., when the trigger 214 is released). In another example, a low battery level at the delivery device 202 may direct the user via the application 230 to replace or recharge the battery within the delivery device 202.
5. In some embodiments, the wireless communication between the UE 218 and/or the temperature sensor 204 may utilize Bluetooth (unilateral or bilateral) or wireless internet. Wireless internet may include, for example, WiFi, cellular networks, etc.
6. In some embodiments, haptic feedback is used by the UE 218 to alert the user of various stages in the recharge process. For example, the UE 218 may vibrate when user input is requested by the application 230 during the recharge process. In another example, the UE 218 may vibrate when the AC system of the vehicle is fully charged, indicating that the user is to disconnect the delivery device 202 from the AC system of the vehicle. In another example, the UE 218 may vibrate when the refrigerant container 206 is to be agitated by the user in order to prevent freezing of the refrigerant in the delivery device 202.
7. In some embodiments, various features in the engine bay (e.g., the low-pressure AC port) may be located for the user by taking a picture of the engine bay of the vehicle (e.g., using the UE 218). The user may enter the make and model information into the application 230. The picture may, for example, be sent by the application 230 to a remote server to provide object detection capabilities (e.g., a remote server or service utilizes object detection algorithms to identify the low-pressure port in the picture, which may be aided by the make and model information entered by the user). In other embodiments, general object matching algorithms may be applied to objects in the picture to identify the AC tubing along with the AC low-pressure port, regardless of the make and model of the vehicle. In other embodiments, the user may enter the make and model information into the application 230, which is used to obtain a picture or diagram of the engine bay that includes information identifying the low-pressure port to the user (e.g., a marked up standard picture of the engine bay or a line drawing depicting the low-pressure port for the specific make and model of vehicle entered by the user).
8. In some embodiments, the application 230 provides a tech support feature to the user. For example, the user may utilize the application 230 to request tech support if the user is unable to locate the low-pressure port on their vehicle, and/or if the user is having difficulty during the recharge process. The tech support provided by the application 230 may include video chat, text chat, a voice call, etc. The tech support feature may automatically occur in some cases and/or may be initiated by the user. For example, an automatic tech support action may be initiated by the application 230 based on the temperatures and/or the pressures measured by the system 200 are outside of expected values.
9. In some embodiments, the application 230 automatically handles the recharging process once a basic setup of the system 200 is complete, and will automatically shut off delivering refrigerant to the vehicle once the pressure sensed by the delivery device 202 of the low-pressure port reaches a preset threshold pressure. This will be discussed in more detail below.
10. In some embodiments, the temperature sensor 204 is used to measure the AC vent temperature and transmit the temperature to the delivery device 202 or to the UE 218 for use during the recharge process. Generally, the AC vent temperature is used to determine if the AC system for the vehicle generating cold air after a desired AC system pressure is reached, which may be used to stop the recharge process. Further, the local conditions (e.g., humidity and/or temperature) for the delivery device 202 may be used to estimate an expected temperature for the AC vent, which, when a desired AC system pressure is reached, may be used to stop the recharge process.

Figure 3:
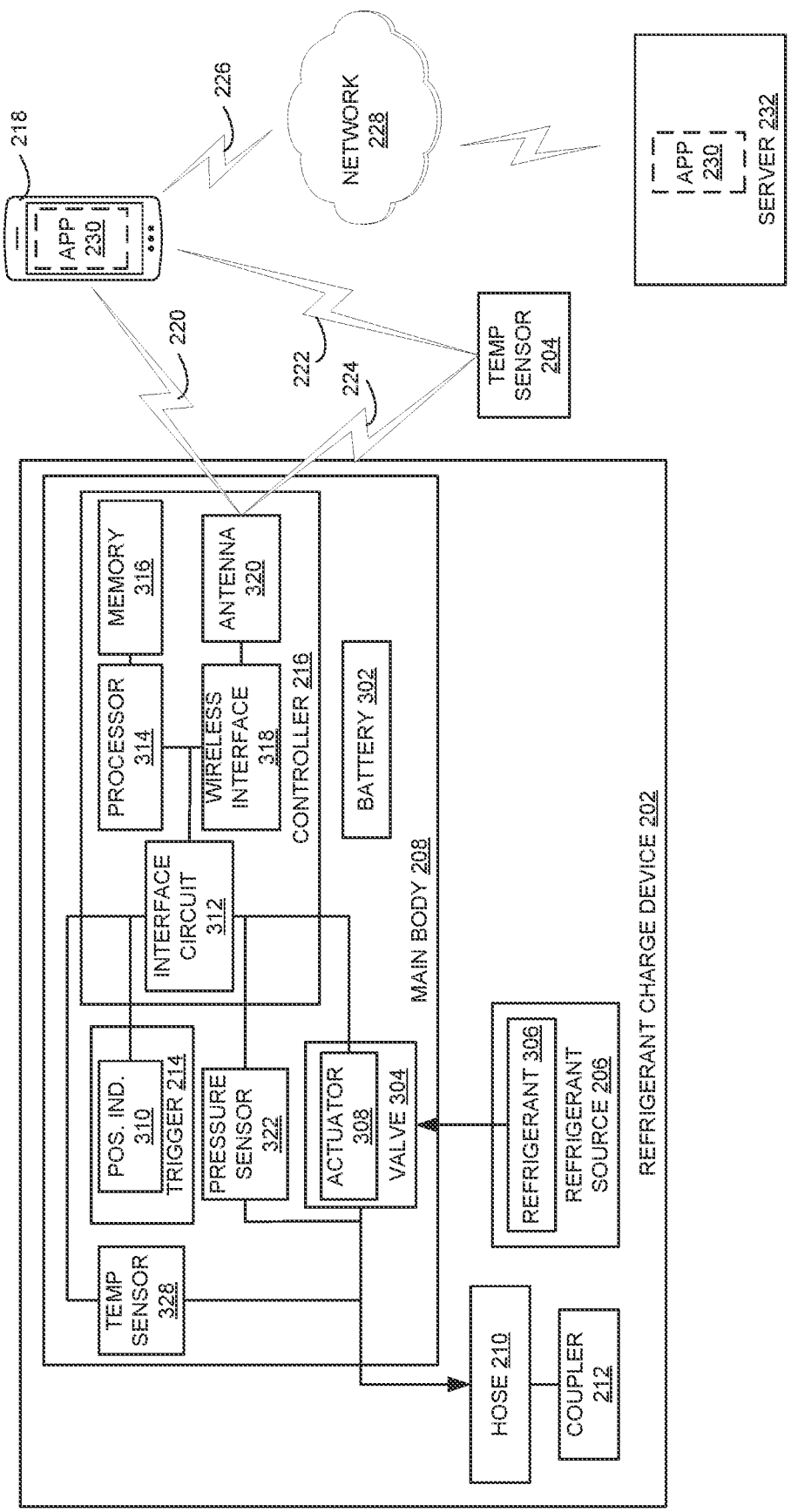
FIG. 3 is a block diagram of a refrigerant charge device of FIG. 2.

FIG. 3 is a block diagram of the delivery device 202 in an exemplary embodiment. In this embodiment, the main body 208 of the delivery device 202 includes a battery 302. The battery 302 comprises any component, system, or device that provides electrical power to the delivery device 202. In some embodiments, the battery 302 comprises a primary battery, while in other embodiments, the battery 302 comprises a secondary battery. The main body 208 in this embodiment includes a valve 304, which selectively provides a flow path for a refrigerant 306 stored by the refrigerant container 206 to the hose 210 during the recharge process. In some embodiments, the valve 304 is operated using an actuator 308, by and under direction of the controller 216. In other embodiments, the valve 304 is operated using the actuator 308, by the controller 216 under direction of the application 230 executing on the UE 218. In this embodiment, the trigger 214 includes a position indicator 310. The position indicator 310 comprises any component, system, or device that provides information to the controller 216 regarding whether the trigger 214 is depressed or not depressed by the user. The state of the trigger 214 sensed by the position indicator 310 is forwarded to the application 230 by the controller 216 in some embodiments.

In this embodiment, the main body 208 further includes a pressure sensor 322 and a temperature sensor 327. The pressure sensor 322 comprises any component, system, or device that measures a pressure. The pressure sensor 322 is in fluid communication with an output of the valve 304 and is used to measure a pressure at the hose 210. For instance, when the coupler 212 is connected to port of a refrigeration system, the pressure sensor 322 measures the pressure at the port when the valve 304 is closed and a pressure of refrigerant 306 when the valve 304 is open. The temperature sensor 328 comprises any component, system, or device that measures a temperature. The temperature sensor 328 is in fluid communication with an output of the valve 304 and is used to measure a temperature at the hose 210. For instance, when the coupler 212 is connected to a port of a refrigeration system, the temperature sensor 328 measures the temperature at the port when the valve 304 is closed or a temperature of the refrigerant 306 when the valve 304 is open. Although the pressure sensor 322 and the temperature sensor 328 are illustrated as part of main body 208 in FIG. 3, the pressure sensor 322 and/or the temperature sensor 328 may be included as part of coupler 212 in some embodiments. In other embodiments, the pressure sensor 322 and the temperature sensor 328 are separate devices that wirelessly communicate with controller 216 and/or the UE 218 in a manner similar to temperature sensor 204.

In this embodiment, controller 216 includes an interface circuit 312. The interface circuit 312 comprises any component, system, or device that interfaces with position indicator 310 for the trigger 214, the actuator 308 for the valve 304, the pressure sensor 322, and the temperature sensor 328. For example, the interface circuit 312 may include a current driver that energizes a coil on the actuator 308, thereby re-positioning the valve 304 between an open position and a closed position to selectively provide the refrigerant 306 to an AC system during a recharge process.

Controller 216 in this embodiment further includes a processor 314 and a memory 316. The processor 314 comprises any component, system, or device that performs the functions described herein for controller 216. The memory 316 comprises any component, system, or device that stores data. In some embodiment, the memory 316 stores pre-programmed instructions that are executable by the processor 314 when performing the functions described herein for the controller 216.

The controller 216 in this embodiment further includes a wireless interface 318 and at least one antenna 320. The wireless interface 318 comprises any component, system, or device that converts signals generated by the processor 314 into Radio Frequency (RF) signals, which are applied by the wireless interface 318 to the antenna 320, thereby generating the wireless links 220, 222, and 224.

Figure 4:
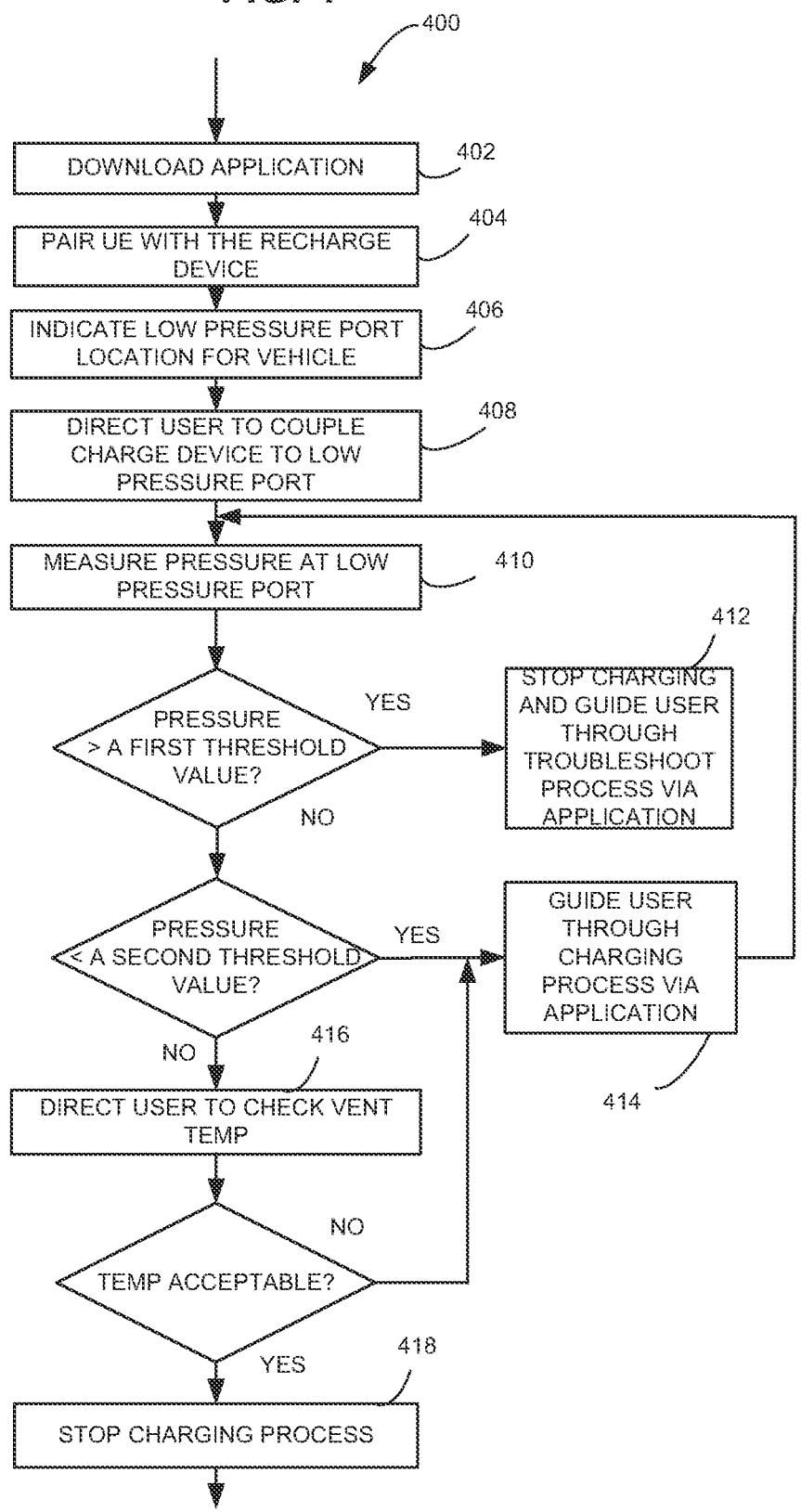
FIG. 4 is a flow chart of a method of recharging a vehicle refrigeration system in an exemplary embodiment.
Figure 5:
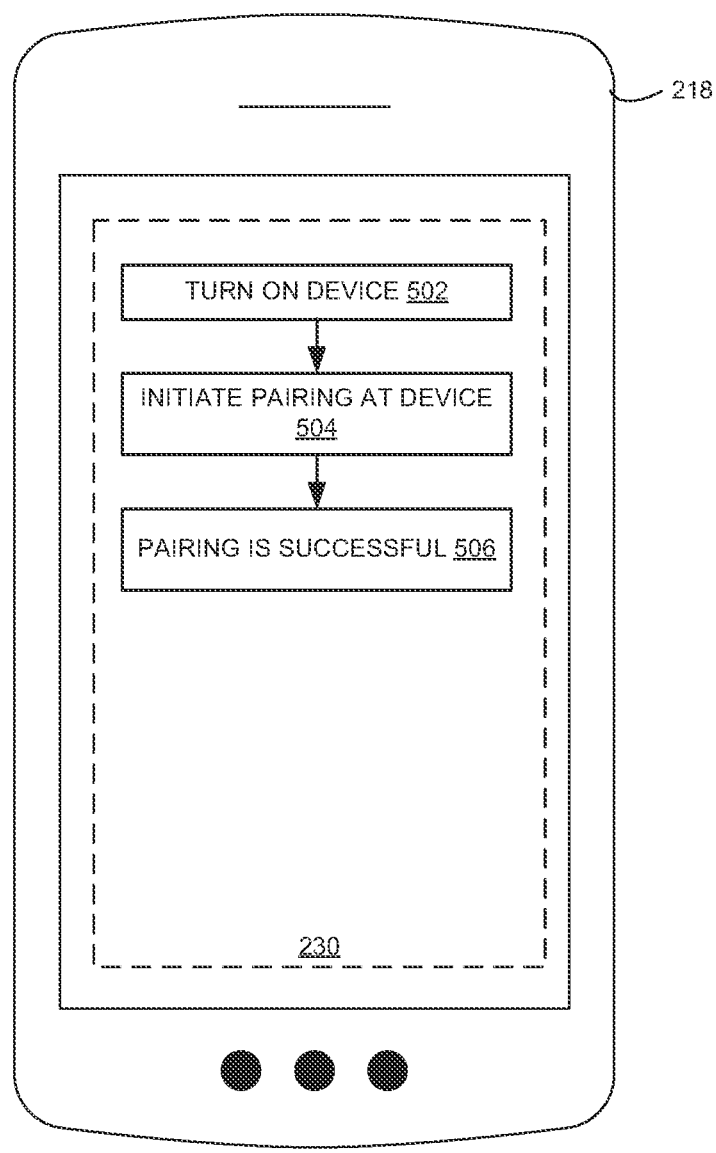
FIG. 5 depicts various user-interactive display elements presented to a user by an application during an initial stage of a refrigerant charge process in an exemplary embodiment.
Figure 6:
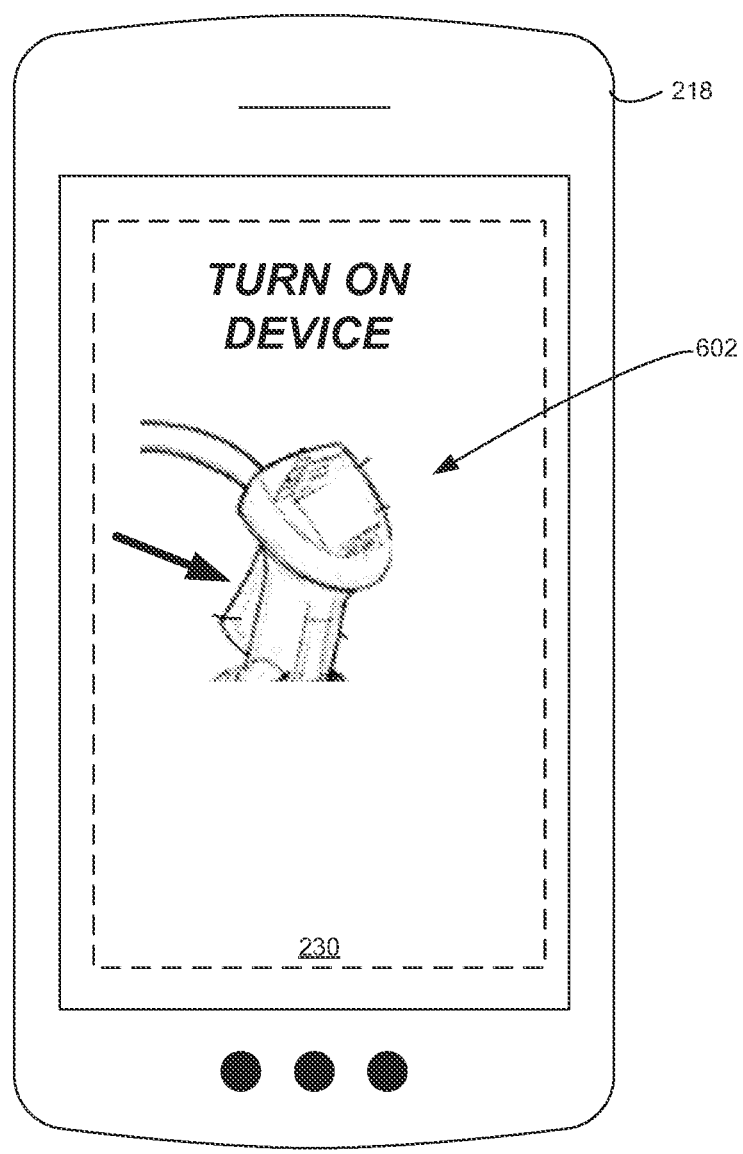
FIG. 6 depicts an instructional graphic presented to the user by the application during the initial setup stage of the refrigerant charge process.
Figure 7:
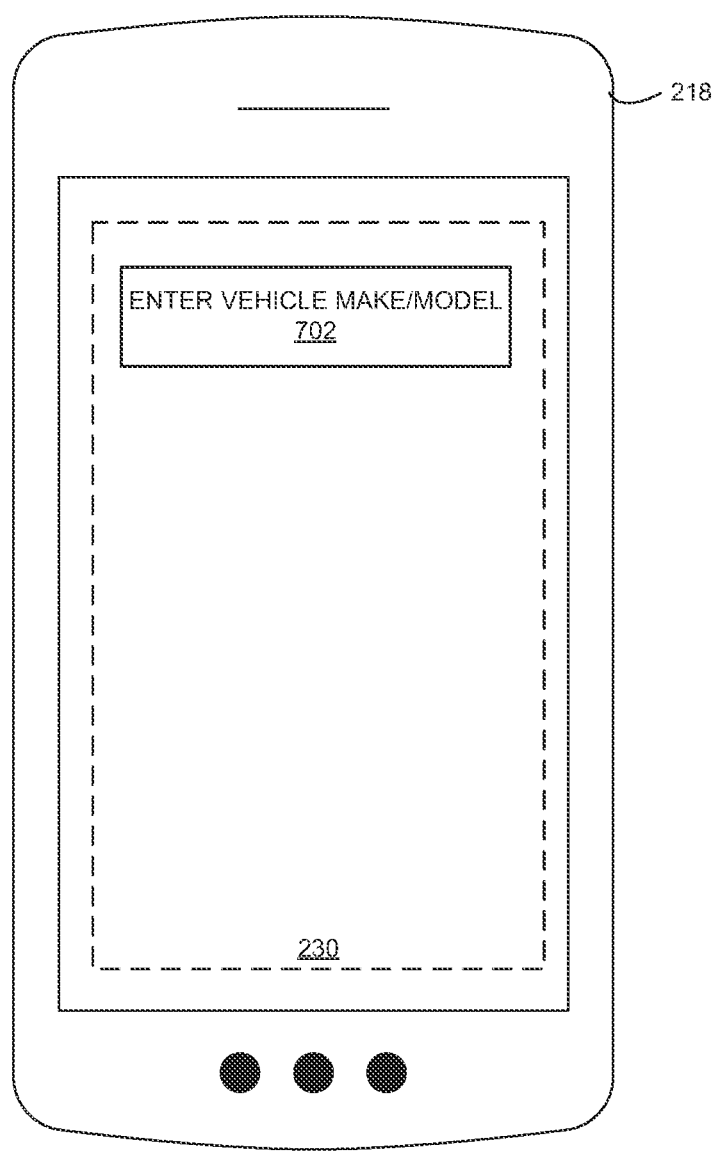
FIG. 7 depicts a user-interactive display element presented to the user during an intermediate setup stage in the refrigerant charge process.
Figure 8:
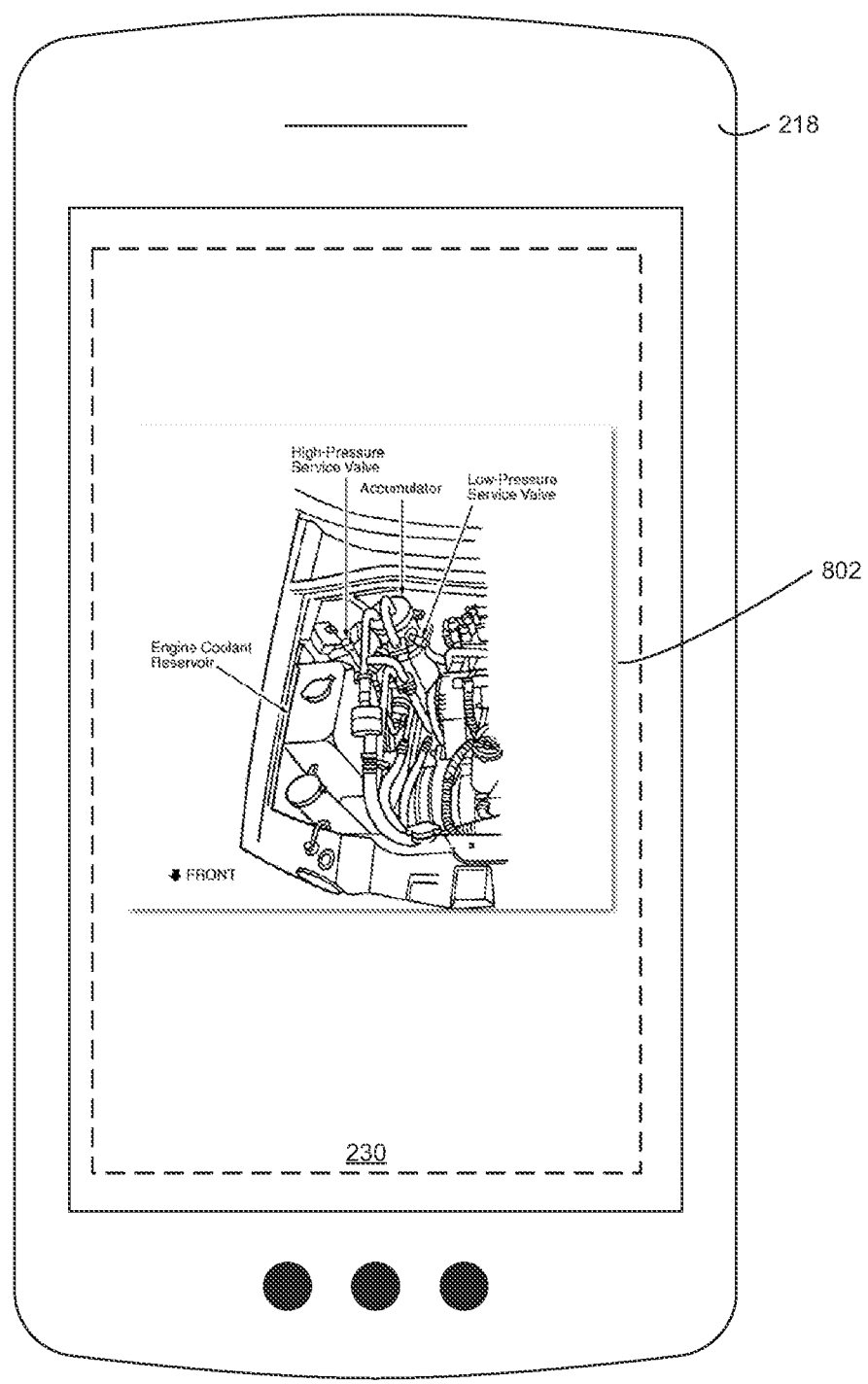
FIG. 8 depicts an instructional graphic presented to the user by the application at a final setup stage in the refrigerant charge process.

FIG. 4 is a flow chart of a method 400 of recharging a refrigeration system in an exemplary embodiment, and FIGS. 5-13 depict various user-interactive display elements and graphics that may be presented to a user by the application 230 during the refrigerant recharge process. The steps of the method 400 will be discussed with respect to the system 200 (see FIGS. 2-3), although the method 400 may be performed by other systems, not shown. The steps of the method 400 are not all inclusive, and the method 400 may include other steps, not shown. Further, the steps of the method 400 may be performed in an alternate order.

To begin a recharge process using the delivery device 202, a user first downloads the application 230 to the UE 218 (see step 402). To do so, the user may scan a QR code located on the delivery device 202, which directs the UE 218 to access the server 232 (e.g., using the wireless link 226 and the network 228), and download the application 230 from the server 232 to the UE 218. After downloading and executing the application 230, the application 230 directs the user to pair the UE 218 with the delivery device 202, (see step 404). For example, the application 230 may direct the user to turn on the delivery device 202 (e.g., via notification 502, see FIG. 5), initiate a pairing for the delivery device 202 (e.g., via notification 504, see FIG. 5), and subsequently, the application 230 may notify the user that the pairing was successful (e.g., via notification 506, see FIG. 5 and/or a LED on the delivery device 202 (not shown)). Pairing the UE 218 with the delivery device 202 may be performed in a number of different ways that generally depends upon the wireless standards used to implement the wireless link 220 between the UE 218 and the delivery device 202. In some embodiments, the user turns on the delivery device 202 by squeezing or touching the trigger 214 (e.g., the application 230 may instruct the user to do so via graphic 602, at FIG. 6). The user may also pair the delivery device 202 with the UE 218 by squeezing or touching the trigger 214.

In response to pairing the UE 218 with the delivery device 202, the application 230 indicates to the user a location of the AC low-pressure port on the vehicle (see step 406), and directs the user to attach the coupler 212 on the hose 210 of the delivery device 202 onto the AC low-pressure port of the vehicle (see step 408). In one embodiment, the application 230 directs the user to enter, using the UE 218, the make and model number of the vehicle that will be serviced by the delivery device 202 (see notification 702 at FIG. 7). Using the make and model number obtained from the user, the application 230 retrieves and displays a diagram of the engine bay and/or a photograph of the engine bay that identifies the location of the AC low-pressure AC port (see graphic 802, FIG. 9). In another embodiment, the application 230 directs the user to photograph the engine bay of the vehicle, and the application indicates on the photograph the location of the AC low-pressure port on the vehicle (e.g., using the object detection and photograph markup service previously described).

Figure 9:
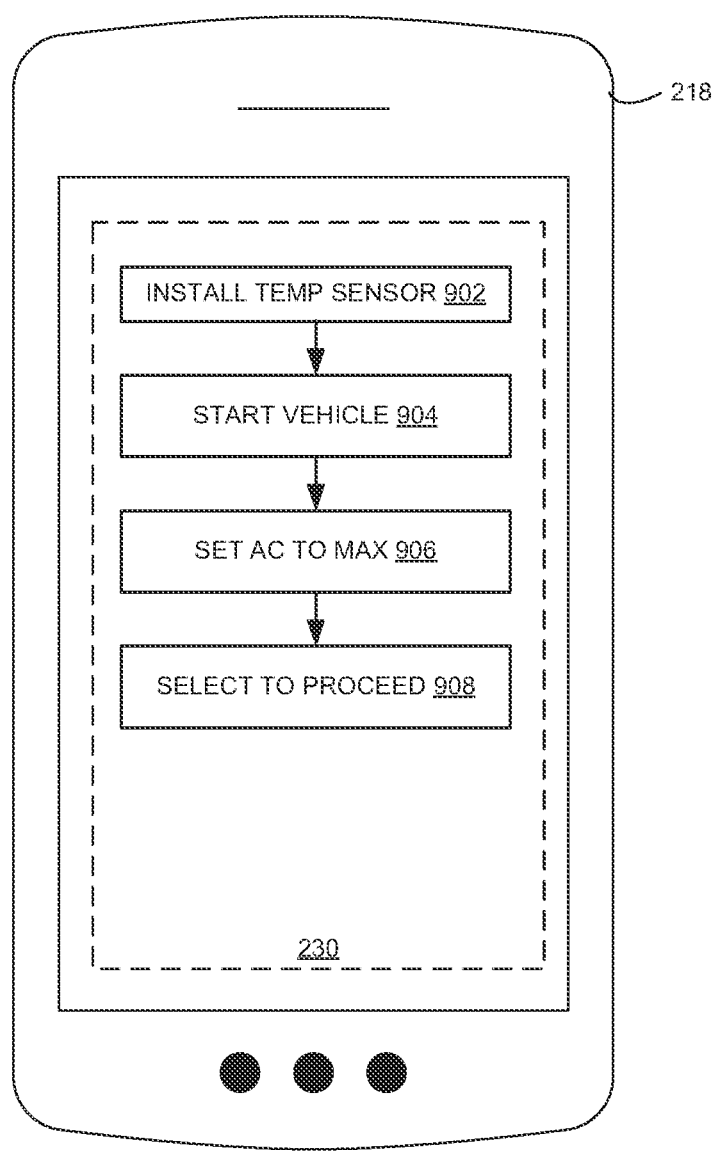
FIG. 9 depicts user-interactive display elements presented to the user at the final setup stage in the refrigerant charge process.
Figure 10:
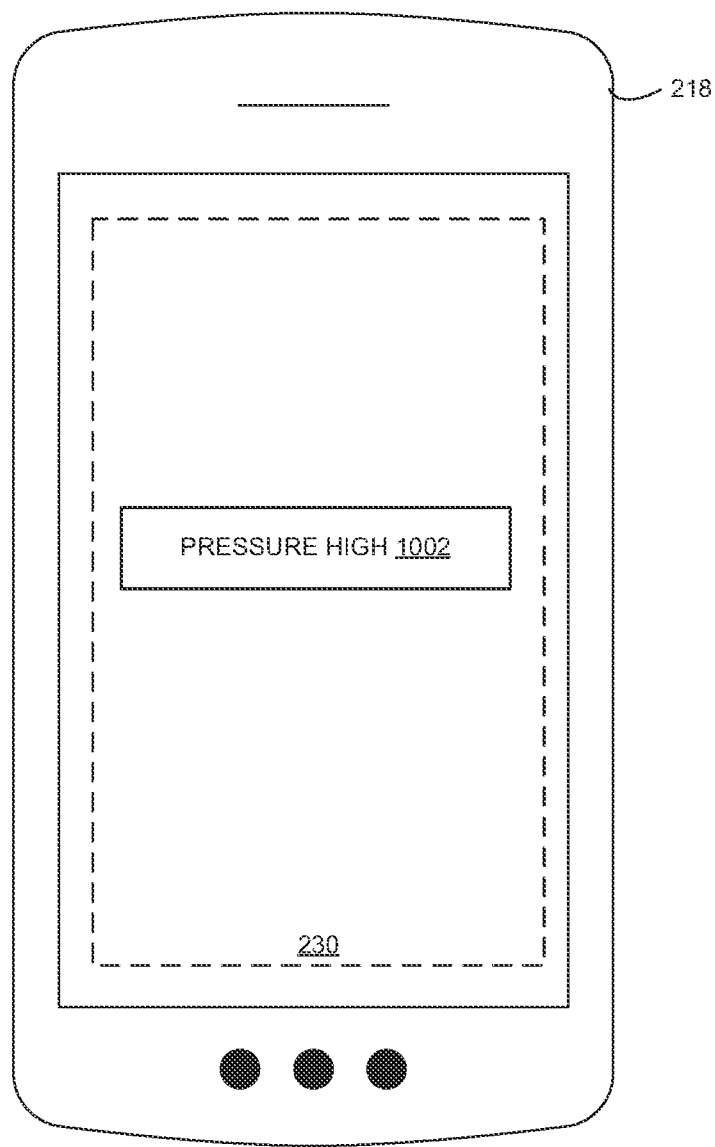
FIG. 10 depicts a user-interactive display element presented to the user during the refrigerant charge process.
Figure 11:
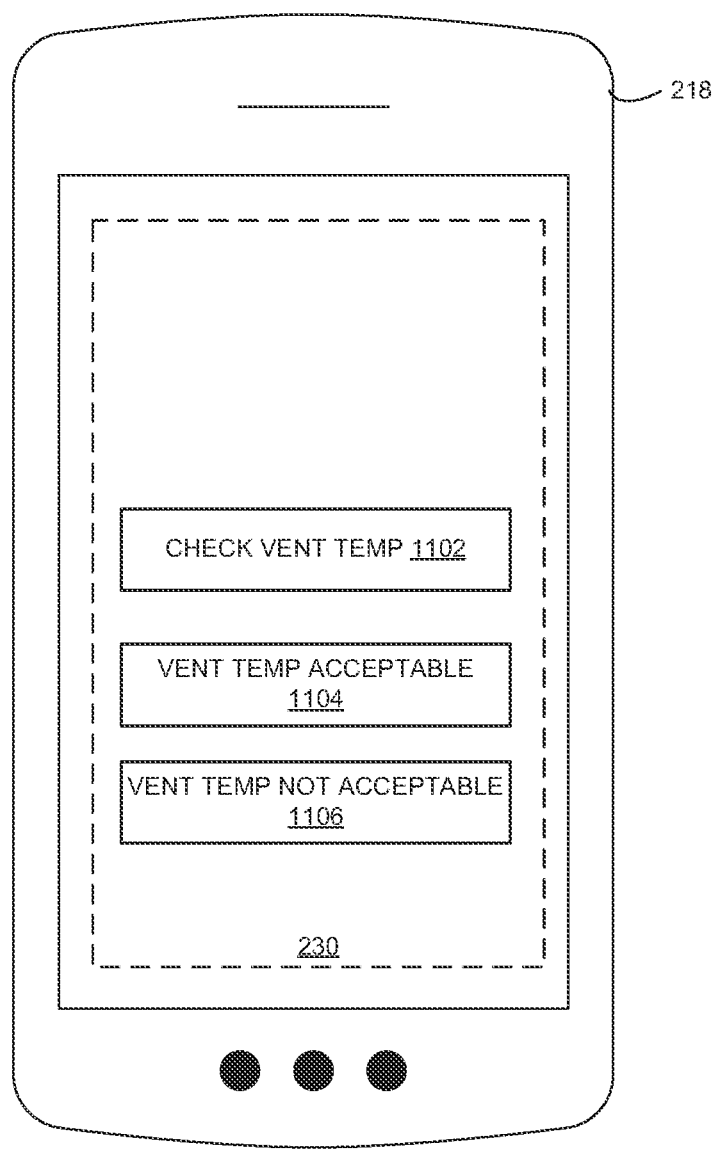
FIG. 11 depicts user-interactive display elements presented to the user during the refrigerant charge process.
Figure 12:
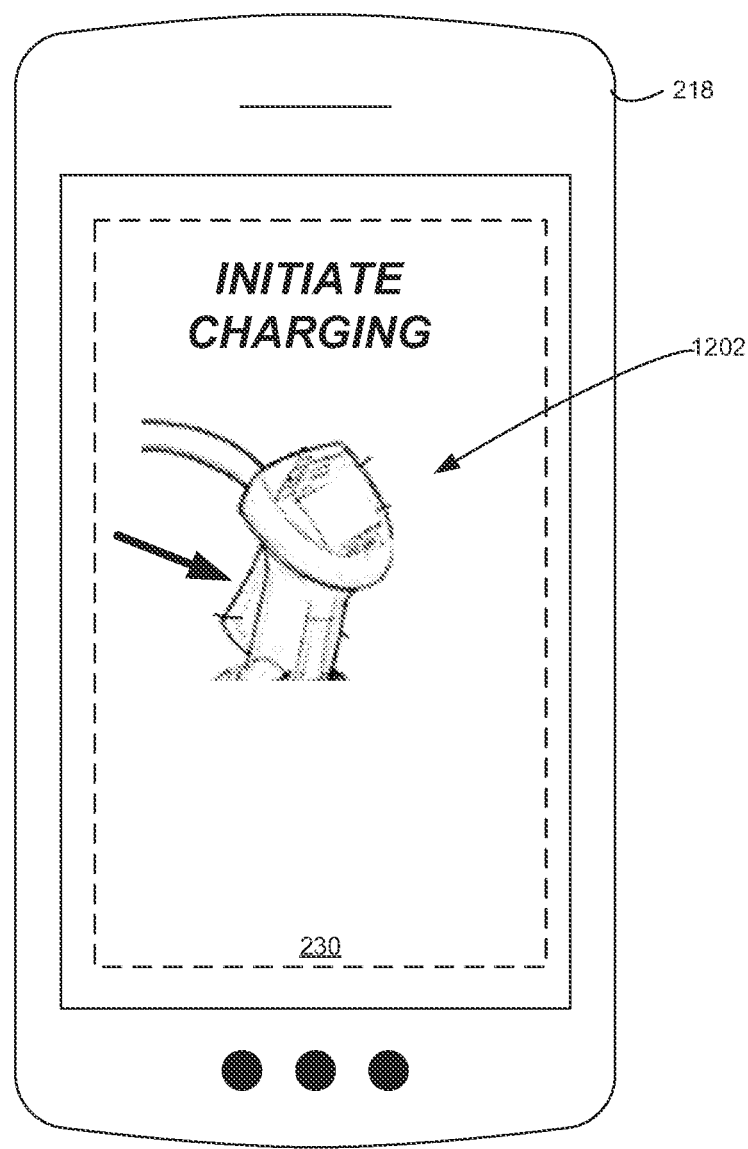
FIG. 12 depicts an instructional graphic presented to the user by the application to initiate the refrigerant charge process.
Figure 13:
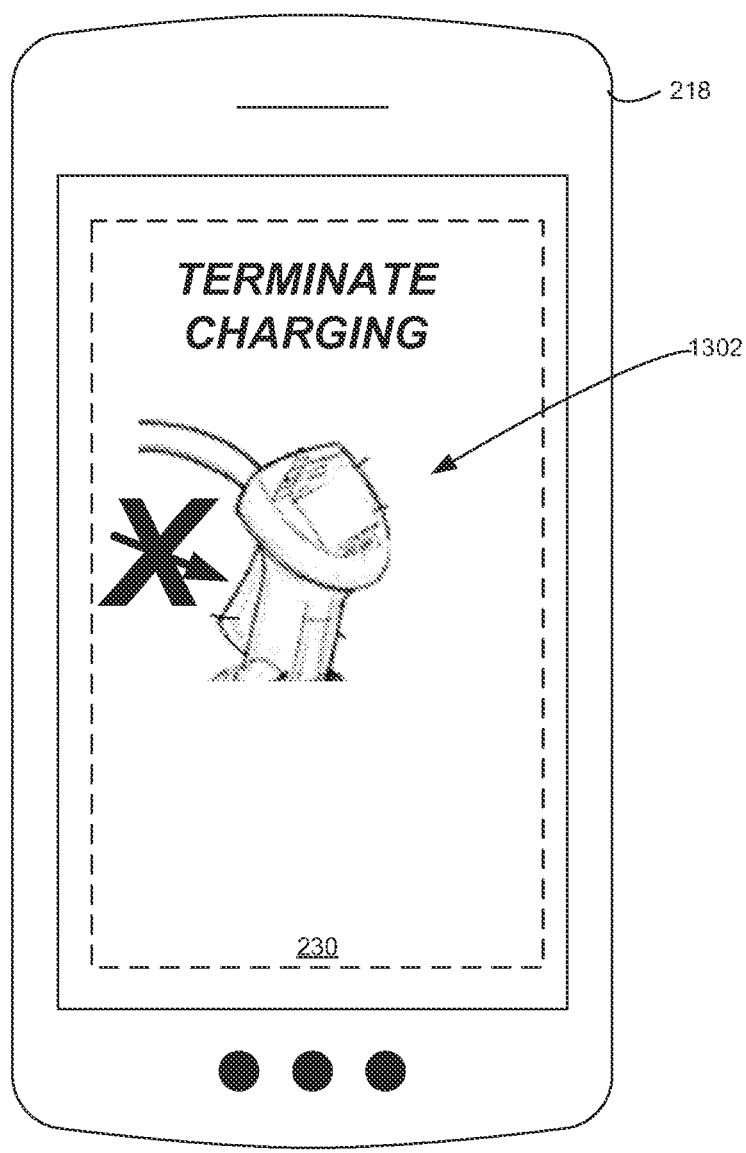
FIG. 13 depicts an instructional graphic presented to the user by the application to terminate the refrigerant charge process.

With the delivery device 202 attached to the AC low-pressure port, the application 230 may direct the user to install the temperature sensor 204 in an AC vent of the vehicle (e.g., via notification 902 in FIG. 9). The application 230 also instructs the user to turn the vehicle on (e.g., via notification 904) and to set the AC of the vehicle to its maximum cooling setting (e.g., via notification 906). The application 230 may request that the user verify that the vehicle is running and that the AC of the vehicle is set to maximum prior to proceeding (e.g., via notification 908). With the delivery device 202 coupled to the AC low-pressure port of the vehicle, the controller 216 measures the pressure at the AC low-pressure port (e.g., via the pressure sensor 322), and transmits the pressure to the application 230 via the wireless link 220 (see step 410). The pressure is measured and transmitted repeatedly during the recharging process.

The application 230, using the pressure measured by the delivery device 202, performs different actions depending on the pressure. If the application 230 determines that pressure is greater than a first threshold value (e.g., greater than about 50 PSI), then the application 230 automatically stops the recharging process (if recharging is in progress) and guides the user through a troubleshooting process (see step 412, e.g., notification 1002 of FIG. 10). For example, the application 230 may query the user to ensure that the vehicle is running and that the AC for the vehicle is also running. If the vehicle is running and the AC is on, then the application 230 may initiate a call with a technician to provide additional technical support, which is one of the technical support aspects previously described.

If the application 230 determines that the pressure is less than a second threshold value (e.g., less than about 25 PSI), then the application 230 guides the user through a recharging process (see step 414, discussed below). If the application 230 determines that the pressure is between the first threshold value and the second threshold value (e.g., the pressure is between about 25 PSI and about 50 PSI), then the application 230 directs the use to manually check the temperature at the AC vent of the vehicle, for example, using a hand (see step 416, notification 1102 of FIG. 11) and indicate in the application 230 whether the temperature is acceptable or not acceptable (e.g., via user entries 1104, 1106 of FIG. 11). If the user indicates on the application 230 that the temperature is acceptable, then the application 230 directs the delivery device 202 to stop the recharging process if the recharging process is in progress (see step 418). If the user indicates on the application 230 that the temperature is not acceptable, then the application 230 guides the user through the recharging process (see step 412).

In order to guide the user through a recharging process, the application 230 in some embodiments, uses the location of the UE 218 to obtain information regarding a local temperature, a local humidity, and/or a local pressure at the service location for the vehicle. For instance, the application 230 may request that the user enable location services, if location services are currently off at the UE 218, and the application 230 may query a remote database for a local temperature, pressure, humidity, etc., and/or query other application executing on the UE 218 for this information, in order to improve the recharging process. The application 230 may also utilize other applications executing on the UE 218 to obtain this information, as previously described above.

With the local conditions determined and the pressure and/or temperature at the low-pressure port 120 being measured by the controller 216 and forwarded to the application 230 via wireless link 220, the application 230 initiates the recharge process. In one embodiment, the application 230 directs the user to squeeze or touch the trigger 214 to begin the recharge process (see notification 1202 of FIG. 12), which directs the controller 216 to close the valve 304 using the actuator 308. In another embodiment, the application 230 automatically initiates the charge process by directing the controller 216 to close the valve 304 using the actuator 308 via commands sent from the UE 218 to the controller 216 via the wireless link 220. In another embodiment, the user utilizes the application 230 to generate commands that direct the controller 216 to close the valve 304 using the actuator 308. For example, the application 230 may display a user-selectable input, such as a button, which, when pressed by the user, generates commands that direct the controller 216 to close the valve 304 using the actuator 308.

During the recharge process, the application 230 monitors the AC vent temperature sensed by the temperature sensor 204 (when used), directly via wireless link 222 or indirectly via wireless link 224 between the controller 216 and the temperature sensor 204 (e.g., the controller 216 communicates with the temperature sensor 204 via wireless link 224, and forwards the temperature information to the application 230 via wireless link 220). The application 230 further monitors the pressure at the low-pressure port 120 via the pressure sensor 322 and/or the temperature at the low-pressure port 120 via the temperature sensor 328 (see FIG. 3), which is sent by the controller 216 to the UE 218 via the wireless link 220. With the valve 304 open, the refrigerant 306 flows from the refrigerant container 206 through the valve 304, hose 210, and coupler 212 and into the AC low-pressure port of the vehicle AC system. The application 230 monitors the pressure at the low-pressure port 120 and/or the temperature at the low-pressure port 120 while the refrigerant 306 is being added to the refrigeration system 100. The application 230 may periodically pause delivering refrigerant 306 during the recharge process in order to measure the pressure and/or the temperature at the low-pressure port 120, since the pressure sensor 322 and the temperature sensor 328 are in fluid communication with both refrigerant source 206 and the low pressure port 120 when the valve 304 is open.

The application 230 determines when to stop the charge process based on one or more of the temperature sensed by the temperature sensor 204, the local humidity, the local temperature, the local pressure at the service location for the vehicle, characteristic information about the vehicle, the pressure at the low-pressure port 120, and/or the temperature at the low-pressure port 120. For example, application 230 may determine a desired or threshold pressure value at low-pressure port 120 based on characteristics of the refrigeration system 100 for the make and model of the vehicle and atmospheric conditions at the service location for the vehicle, such as one or more of the local humidity, local temperature, and local pressure. The user may enter the make and model of the vehicle into application 230 in various ways, such as through direct keying into UE 218, scanning a code, scanning an image or text, or photographing the engine bay or other portion of the vehicle. Application 230 may obtain characteristic information about the refrigeration system 100 for the make and model of the vehicle, as entered by the user, from local storage, or application 230 may query a remote database. Alternatively, the user may enter characteristics of the refrigeration system 100 directly into application 230, such as through direct keying into UE 218, scanning a code, or scanning an image or text indicative of the characteristics.

Application 230 may then evaluate when the pressure measured at low-pressure port 120 meets the desired or threshold pressure value, such as in the manner discussed above, and initiate termination of the charging process. In one embodiment, the application 230 directs the user to stop squeezing or touching the trigger 214 to stop the charge process (see notification 1302 of FIG. 13), which directs the controller 216 to open the valve 304 using the actuator 308. In another embodiment, application 230 may display a user-selectable input, such as a button which, when pressed by the user, generates commands that direct the controller 216 to open valve 304 using actuator 308. In another embodiment, the application 230 automatically terminates the charge process by directing the controller 216 to open the valve 304 using the actuator 308, which occurs independently of whether or not the user is operating the trigger 214.

Consistent with the examples provided above, UE 218 and application 230 may in some implementations provide an essentially handsfree or automatic control of the refrigerant charging process. As stated, following the pairing of delivery device 202 with UE 218, the application 230 may automatically initiate the charge process by directing the controller 216 to close the valve 304 using the actuator 308. Alternatively, application 230 may first display a button which, when pressed by the user, generates commands that direct the controller 216 to close the valve 304 using actuator 308. After determining that the desired or threshold pressure is reached at low-pressure port 120, application 230 may automatically terminate the charge process by directing controller 216 to open valve 304 using actuator 308, as stated above. As a result, the overall charging process may be accomplished by the user simply pairing delivery device 202 with UE 218, or optionally also pressing a button on application 230, after which the charging, sensing, and evaluating steps are handled by application 230 independent of additional user action.

An example technical effect of the apparatus and method described herein includes one or more of: (a) automatically terminating a refrigerant recharge process independent of user action; (b) dynamically adjusting the recharge process based on local environmental conditions; (c) conducting an automatic recharging process based on vehicle characteristics and local environmental conditions independent of user action; and (d) providing real-time or near real-time technical support to improve the refrigerant recharge process.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for recharging a refrigeration system of a vehicle, the system comprising:
   a refrigerant delivery device configured to removably couple to a recharge port of the refrigeration system, the refrigerant delivery device comprising:
   a controller configured to communicatively couple with User Equipment (UE) of a user over a communication channel;
   a trigger coupled to the controller;
   a position indicator associated with the trigger;
   a refrigerant container storing a refrigerant; and
   at least one sensor configured to measure one or more parameters of the refrigeration system,
   wherein the controller is configured to:
   transmit, via the communication channel, a status of the refrigerant delivery device to the UE, the status including a position of the trigger as detected by the position indicator;
   receive, via the communication channel, one or more commands from the UE comprising to initiate a recharge process for the refrigeration system;
   execute the one or more commands; and selectively cause delivery of the refrigerant to the refrigeration system in response to the one or more commands.

2. The system of claim 1, wherein the at least one sensor comprises a pressure sensor, and the one or more parameters comprises a pressure at the recharge port of the refrigeration system.

3. The system of claim 1, wherein the at least one sensor comprises a temperature sensor, and the one or more parameters comprises a temperature of air exiting an AC vent of the vehicle.

4. The system of claim 1, wherein the at least one sensor comprises a temperature sensor, and the one or more parameters comprises a temperature of the refrigerant at the recharge port of the refrigeration system.

5. A system for recharging a refrigeration system of a vehicle, the system comprising:
a refrigerant delivery device configured to removably couple to a recharge port of the refrigeration system, the refrigerant delivery device comprising:
a controller configured to communicatively couple with User Equipment (UE) of a user over a communication channel;
a trigger coupled to the controller;
a position indicator associated with the trigger;
a refrigerant container storing a refrigerant; and
at least one sensor configured to measure one or more parameters of the refrigeration system;
wherein the controller is configured to:
transmit, via the communication channel, a status of the refrigerant delivery device, the status including a position of the trigger as detected by the position indicator; and
User Equipment (UE) of a user configured to communicatively couple with the controller of the refrigerant delivery device over the communication channel to coordinate the recharging of the refrigeration system, the UE further configured to:
receive one or more parameters of the refrigeration system;
receive the status of the refrigerant delivery device from the refrigerant delivery device via the communication channel; and
provide one or more commands to selectively deliver refrigerant to the refrigeration system based on the received one or more parameters of the refrigeration system.

6. The system of claim 5, wherein:
the one or more parameters comprises a pressure at the recharge port of the refrigeration system.

7. The system of claim 6, wherein:
the UE is further configured to:
determine that the pressure at the recharge port is greater than a threshold value;
provide the one or more commands to terminate delivery of the refrigerant to the refrigeration system in response to determining that the pressure at the recharge port is greater than the threshold value; and
initiate a troubleshooting process with the user.

8. The system of claim 6, wherein:
the UE is further configured to:
determine that the pressure at the recharge port is less than a threshold value;
provide the one or more commands to initiate delivery of the refrigerant to the refrigeration system in response to determining that the pressure at the recharge port is less than the threshold value.

9. The system of claim 6, wherein:
the UE is further configured to:
determine that the pressure at the recharge port is about equal to a threshold value; and
provide the one or more commands to terminate delivery of the refrigerant to the refrigeration system in response to determining that the pressure at the recharge port is about equal to the threshold value.

10. The system of claim 9, wherein:
the UE is further configured to:
receive information relating to characteristics of the vehicle;
access atmospheric data at a location of the vehicle; and
determine the threshold value based at least in part on the characteristics of the vehicle and the atmospheric data.

11. The system of claim 5, wherein:
the UE is further configured to:
display one or more user-selectable inputs based on the position of the trigger, the one or more user-selectable inputs configured, upon selection, to generate the one or more commands to selectively deliver refrigerant to the refrigeration system; and
transmit the one or more commands to the controller.

12. A method operable by User Equipment (UE) of a user for recharging a refrigeration system of a vehicle, the method comprising:
receiving, by the UE, input to initiate the recharging of the refrigeration system;
receiving, by the UE, one or more parameters of the refrigeration system from the refrigerant delivery device via a communication channel between the UE and the refrigerant delivery device;
receiving, by the UE, a status of the refrigerant delivery device via the communication channel, the status including a position of a trigger associated with a controller in the refrigerant delivery device; and
providing, by the UE, one or more commands to initiate delivery of refrigerant to the refrigeration system based on the one or more parameters of the refrigeration system.

13. The method of claim 12, wherein:
the one or more parameters comprises a pressure at the recharge port of the refrigeration system.

14. The method of claim 13, further comprising:
determining, by the UE, that the pressure at the recharge port is greater than a threshold value;
providing, by the UE, the one or more commands to terminate delivery of the refrigerant to the refrigeration system in response to determining that the pressure at the recharge port is greater than the threshold value; and
initiating, by the UE, a troubleshooting process with the user.

15. The method of claim 13, further comprising:
determining, by the UE, that the pressure at the recharge port is less than a threshold value; and
providing, by the UE, the one or more commands to initiate delivery of the refrigerant to the refrigeration system in response to determining that the pressure at the recharge port is less than the threshold value.

16. The method of claim 13, further comprising:
determining, by the UE, that the pressure at the recharge port is about equal to a threshold value; and
providing, by the UE, the one or more commands to terminate delivery of the refrigerant to the refrigeration system in response to determining that the pressure at the recharge port is about equal to the threshold value.

17. The method of claim 12, further comprising:
receiving, by the UE, information relating to characteristics of the vehicle;
accessing, by the UE, atmospheric data at a location of the vehicle; and
determining, by the UE, the threshold value based at least in part on the characteristics of the vehicle and the atmospheric data.

18. The method of claim 12, wherein the receiving, by the UE, input to initiate the recharging of the refrigeration system comprises receiving a selection via a user-selectable input on the UE.

19. The method of claim 12, further comprising:
receiving, by the UE from the user, a make and model of the vehicle;
obtaining, by the UE, a diagram of an engine bay of the vehicle that identifies the recharge port of the refrigeration system; and
displaying, by the UE, the diagram to the user to direct the user to couple the refrigerant delivery device to the recharge port of the refrigeration system.

20. The method of claim 12, further comprising:
directing, by the UE, the user to take a photograph of an engine bay of the vehicle using the UE;
obtaining, by the UE, a markup of the photograph that identifies the recharge port of the refrigeration system; and
displaying, by the UE, the photograph as marked-up to the user to direct the user to couple the refrigerant delivery device to the recharge port of the refrigeration system.

* * * * *